(12) United States Patent
Kivekäs et al.

(10) Patent No.: US 7,848,741 B2
(45) Date of Patent: Dec. 7, 2010

(54) METHOD AND SYSTEM FOR INTERFERENCE DETECTION

(76) Inventors: Kalle Kivekäs, Pitkänkalliontie 16 C, 02176 Espoo (FI); Jukka Reunamäki, Elementinpolku 15 C 32, 33720 Tampere (FI); Päivi M. Ruuska, Orivedenkatu 8 F 115, 33720 Tampere (FI)

( * ) Notice: Subject to any disclaimer, the term of this patent is extended or adjusted under 35 U.S.C. 154(b) by 794 days.

(21) Appl. No.: 10/747,220

(22) Filed: Dec. 30, 2003

(65) Prior Publication Data

US 2005/0159109 A1 Jul. 21, 2005

(51) Int. Cl.
*H04W 24/00* (2009.01)

(52) U.S. Cl. .................. 455/423; 455/425; 455/67.11; 455/67.13

(58) Field of Classification Search ............... 455/423, 455/67.11, 67.13, 226.1, 226.3
See application file for complete search history.

(56) References Cited

U.S. PATENT DOCUMENTS

| | | | |
|---|---|---|---|
| 3,670,275 A | 6/1972 | Kalliomaki et al. | |
| 4,181,892 A | 1/1980 | Dilley | |
| 4,710,975 A | 12/1987 | Okamoto et al. | |
| 5,046,133 A | 9/1991 | Watanabe et al. | |
| 5,056,153 A | 10/1991 | Taniguchi et al. | |
| 5,504,776 A | 4/1996 | Yamaura et al. | |
| 5,539,781 A | 7/1996 | Matsuura | |
| 5,640,694 A | 6/1997 | Milton, Jr. | |
| 5,710,995 A | 1/1998 | Akaiwa et al. | |
| 5,874,916 A | 2/1999 | Desiardi | |
| 5,918,164 A | 6/1999 | Takahashi et al. | |
| 5,974,101 A | 10/1999 | Nago | |
| 6,061,568 A * | 5/2000 | Dent | 455/450 |
| 6,072,994 A | 6/2000 | Phillips et al. | |
| 6,115,409 A | 9/2000 | Upadhyay et al. | |
| 6,278,723 B1 | 8/2001 | Meihofer et al. | 375/133 |
| 6,327,300 B1 | 12/2001 | Souissi et al. | |
| 6,327,312 B1 | 12/2001 | Jovanovich et al. | |
| 6,377,608 B1 | 4/2002 | Zyren | |
| 6,509,934 B1 | 1/2003 | Bao et al. | |
| 6,577,670 B1 | 6/2003 | Roberts | |
| 6,615,040 B1 * | 9/2003 | Benveniste | 455/423 |
| 6,639,541 B1 | 10/2003 | Quintana et al. | |
| 6,711,380 B1 * | 3/2004 | Callaway, Jr. | 455/41.2 |
| 6,718,166 B2 | 4/2004 | Cordone et al. | |
| 6,882,851 B2 * | 4/2005 | Sugar et al. | 455/454 |
| 6,892,054 B2 | 5/2005 | Belcher et al. | |

(Continued)

FOREIGN PATENT DOCUMENTS

EP 1 085 785 A2 3/2001

(Continued)

*Primary Examiner*—Yuwen Pan
(74) *Attorney, Agent, or Firm*—Knobbe Martens Olson & Bear LLP

(57) ABSTRACT

One or more electromagnetic energy measurements are generated. Each of these measurements corresponds to an available communications bandwidth for a communications device and indicates a frequency of a radio frequency (RF) signal source. From these measurement(s), one or more interference sources are identified. These measurements may include a series of electromagnetic energy measurements over a predetermined time period. An interference source may be identified when each measurement in the series of electromagnetic energy measurements indicates an RF energy source at the same frequency. Each of these measurements may be stored. In addition, statistics regarding these measurements may be generated.

29 Claims, 7 Drawing Sheets

U.S. PATENT DOCUMENTS

| | | |
|---|---|---|
| 6,968,197 B2 | 11/2005 | Mori et al. |
| 7,079,812 B2 * | 7/2006 | Miller et al. ............... 455/63.1 |
| 7,089,033 B2 | 8/2006 | Leinonen et al. |
| 7,120,437 B2 | 10/2006 | Benson et al. |
| 7,133,646 B1 | 11/2006 | Miao |
| 7,133,686 B2 | 11/2006 | Hundal et al. |
| 7,146,133 B2 * | 12/2006 | Bahl et al. .................. 455/63.1 |
| 7,158,769 B2 | 1/2007 | Okanoue et al. |
| 7,181,166 B2 | 2/2007 | Shimada et al. |
| 7,212,832 B2 | 5/2007 | Yokota |
| 7,263,355 B2 | 8/2007 | Morikawa et al. |
| 7,292,830 B1 | 11/2007 | Cheung et al. |
| 7,313,413 B2 | 12/2007 | Han |
| 7,317,698 B2 | 1/2008 | Jagger et al. |
| 7,317,751 B2 | 1/2008 | Kyosti |
| 7,372,926 B2 | 5/2008 | Kanemoto et al. |
| 7,444,166 B2 | 10/2008 | Sahota |
| 7,480,490 B2 | 1/2009 | Haartsen |
| 2002/0006174 A1 | 1/2002 | Nafie et al. |
| 2002/0021746 A1 | 2/2002 | Schmidl et al. |
| 2002/0142744 A1 | 10/2002 | Okanoue et al. |
| 2002/0173341 A1 | 11/2002 | Abdelmonem et al. |
| 2002/0176385 A1 | 11/2002 | Huh et al. |
| 2002/0177414 A1 | 11/2002 | Shimada et al. |
| 2003/0058923 A1 | 3/2003 | Chen et al. |
| 2003/0124999 A1 | 7/2003 | Parssinen et al. |
| 2003/0153291 A1 | 8/2003 | Tsushima |
| 2003/0216122 A1 | 11/2003 | Cordone et al. |
| 2003/0224751 A1 | 12/2003 | Vanderhelm et al. |
| 2004/0043733 A1 | 3/2004 | Marrah et al. |
| 2004/0048574 A1 | 3/2004 | Walker et al. |
| 2004/0132410 A1 | 7/2004 | Hundal et al. |
| 2004/0142669 A1 | 7/2004 | Vogt et al. |
| 2004/0171351 A1 | 9/2004 | Nakazawa et al. |
| 2004/0203399 A1 | 10/2004 | Allen |
| 2004/0204031 A1 | 10/2004 | Kardach et al. |
| 2004/0219885 A1 | 11/2004 | Sugar et al. |
| 2004/0224719 A1 | 11/2004 | Nounin et al. |
| 2005/0020297 A1 | 1/2005 | Axness et al. |
| 2005/0181752 A1 | 8/2005 | Sahota |
| 2005/0181823 A1 | 8/2005 | Haartsen |
| 2005/0239497 A1 | 10/2005 | Bahl et al. |
| 2005/0255815 A1 | 11/2005 | Hammerschmidt et al. |
| 2005/0255878 A1 | 11/2005 | Leinonen et al. |
| 2006/0009177 A1 | 1/2006 | Persico et al. |
| 2008/0160916 A1 | 7/2008 | Jagger et al. |

FOREIGN PATENT DOCUMENTS

| | | |
|---|---|---|
| EP | 1 119 112 A2 | 7/2001 |
| EP | 1 119 137 A1 | 7/2001 |
| EP | 1 148 677 A2 | 10/2001 |
| EP | 1 176 731 A1 | 1/2002 |
| EP | 1 187 504 A2 | 3/2002 |
| EP | 1 199 842 A2 | 4/2002 |
| EP | 1 207 654 A2 | 5/2002 |
| EP | 1 220 499 A2 | 7/2002 |
| EP | 1 225 709 A1 | 7/2002 |
| EP | 1 229 693 A2 | 8/2002 |
| EP | 1 389 855 A2 | 2/2004 |
| WO | WO 99/49593 | 9/1999 |
| WO | WO 00/04658 | 1/2000 |
| WO | WO 00/04659 | 1/2000 |
| WO | WO 00/46929 A1 | 8/2000 |
| WO | WO 01/24454 A1 | 4/2001 |
| WO | WO 01/24455 A1 | 4/2001 |
| WO | WO 01/24457 A1 | 4/2001 |
| WO | WO 01/24458 A1 | 4/2001 |
| WO | WO 01/35540 A2 | 5/2001 |
| WO | WO 01/35578 A1 | 5/2001 |
| WO | WO 01/63797 A1 | 8/2001 |
| WO | WO 01/84789 A2 | 11/2001 |
| WO | WO 01/89102 A1 | 11/2001 |
| WO | WO 02/03627 A2 | 1/2002 |
| WO | WO 02/19743 A2 | 3/2002 |
| WO | WO 02/060133 A2 | 8/2002 |
| WO | WO 02/060211 A2 | 8/2002 |
| WO | WO 02/067469 A1 | 8/2002 |
| WO | WO 02/069577 A1 | 9/2002 |
| WO | WO 02/087173 A1 | 10/2002 |
| WO | WO 02/100025 A1 | 12/2002 |
| WO | WO 03/019798 A2 | 3/2003 |
| WO | WO 03/061224 A1 | 7/2003 |
| WO | WO 03/071824 | 8/2003 |

\* cited by examiner

METHOD AND SYSTEM FOR INTERFERENCE DETECTION

FIELD OF THE INVENTION

The present invention relates to wireless communications. More particularly, the present invention relates to techniques for detecting interference.

BACKGROUND OF THE INVENTION

The unlicensed frequency bands of the electromagnetic spectrum are shared with a variety of systems. For example wireless local area networks (WLANs) and Bluetooth networks utilize the Industrial, Scientific, and Medical (ISM) band between 2400 MHz and 2483.5 MHz. In addition, microwave ovens, and harmonics of cellular telephony transmissions (such as GSM 850 and IS-95 transmissions) may cause interference in such unlicensed bands.

It is useful for short-range communications systems (e.g., Bluetooth and IEEE 802.11 networks) to recognize the traffic of neighboring systems. When constant regular transmissions by the interferers in the same channel are recognized, a network or device may avoid collisions with these regular transmissions by scheduling its own transmissions to be within other unoccupied channels or to be at times when other systems do not occupy the channel. Such avoidance reduces the number of retransmissions due to collisions, thereby enabling more efficient use of the band.

Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. Bluetooth devices are designed to find other Bluetooth devices within their communications range and to discover what services they offer.

Bluetooth networks may utilize 79 channels. Each of these channels has a 1 MHz bandwidth. To enhance robustness, Bluetooth networks perform frequency hopping among all or some of these 79 channels.

WLANs are local area networks that employ high-frequency radio waves rather than wires to exchange information between devices. IEEE 802.11 refers to a family of WLAN standards developed by the IEEE. In general, WLANs in the IEEE 802.11 family provide for 1 or 2 Mbps transmission in the 2.4 GHz band using either frequency hopping spread spectrum (FHSS) or direct sequence spread spectrum (DSSS) transmission techniques. Within the IEEE 802.11 family are the IEEE 802.11b and IEEE 802.11g standards, which are collectively referred to herein as IEEE 802.11b/g.

IEEE 802.11b (also referred to as 802.11 High Rate or Wi-Fi) is an extension to IEEE 802.11 and provides for data rates of up to 11 Mbps in the 2.4 GHz band. This provides for wireless functionality that is comparable to Ethernet. IEEE 802.11b employs only DSSS transmission techniques. IEEE 802.11g provides for data rates of up to 54 Mbps in the 2.4 GHz band. For transmitting data at rates above 20 Mbps, IEEE 802.11g employs Orthogonal Frequency Division Multiplexing (OFDM) transmission techniques. However, for transmitting information at rates below 20 Mbps, IEEE 802.11g employs DSSS transmission techniques. The DSSS transmission techniques of IEEE 802.11b/g involve signals that are contained within a 23 MHz wide channel. Several of these 23 MHz channels are within the ISM band.

Current short-range communications systems provide techniques for measuring channel characteristics in a particular frequency band to find interfering systems or devices. However, these techniques are not ideal for collecting statistics of the interferences in the band.

For instance, IEEE 802.11b/g devices employ a carrier sensing technique before transmitting signals. This technique is known as Carrier Sensing Multiple Access/Collision Avoidance (CSMA/CA). CSMA/CA prevents collisions with other transmissions, which have already started. However, such techniques do not prevent collisions when two or more transmissions commence at the same time. Also, other systems that do not employ carrier sensing may commence transmissions while an IEEE 802.11b/g device is transmitting.

To avoid transmitting in channels employed by other systems, Bluetooth employs an adaptive frequency hopping (AFH) technique. With this technique, a frequency hopping Bluetooth device "hops around" channels that are used by other systems. However, before "hopping around" may begin, the devices in the Bluetooth piconet must first identify the static interferences.

Such identification involves measuring electromagnetic energy in the channels available to the Bluetooth piconet. When Bluetooth slave devices perform such measurements, they regularly transmit channel classifications to the master device, which decides which channels may be used for Bluetooth communications. The method to measure and classify the channels is not specified for Bluetooth. Channels can be classified based on received signal strength indication (RSSI) measurements in the slots when the piconet is not transmitting. In slots that the piconet is transmitting, channels are classified based on information regarding received packets, such as bit error or failed packet statistics. Bluetooth channels may also be classified based on a collaborative classification technique. Collaborative classification involves a host knowing other systems employed by the same device and classifies the channels utilized by the other system as "bad."

A drawback of the above channel measurement techniques for detecting interfering transmissions is that they consume a considerable amount of time, power, and bandwidth. Because the measuring is time consuming, it is difficult to collect interference related information.

In addition, RSSI measurements require additional bandwidth and power consumption. For instance, background RSSI measurements can be made when there are not any transmissions in the network. In Bluetooth, it takes about 25 milliseconds (i.e., 79 times 312.5 microseconds) to measure all of the channels once during each 312.5 microsecond half slot. However, one measurement per channel does not reveal if the interference is static or hopping. Therefore, it takes about 250 milliseconds, if it is assumed that at least 10 measurements are required per channel to detect the static interference.

Because the network may not be able to stop its traffic for 250 milliseconds or even for 25 milliseconds, the actual time to measure the channels can be longer, depending on the utilization of the piconet. In addition, those 10 measurements have to be performed again after a short period to detect if some new static interference source has started transmitting, or if some old interference source has stopped transmitting.

In Bluetooth, the performance of error detection requires at least 100 ms (i.e., 79 times 625 microseconds times 2) to receive a packet in every channel, if the network utilization is 100% and only single-slot packets are used. Accordingly, the time for 10 measurements per channel is at least 1 second. However, if the utilization is not 100%, channel classification takes longer.

When the characteristics of the interfering transmissions are known, more efficient use of the band is possible. Accordingly, techniques are needed for the effective detection of interference sources.

SUMMARY OF THE INVENTION

The present invention is directed to a method, system, and computer program product that generates one or more electromagnetic energy measurements. Each of these measurements corresponds to an available communications bandwidth for a communications device. The method, system, and computer program product also identify one or more interference sources based on the measurement(s). Each of these measurements indicates a frequency of a radio frequency (RF) signal source. These measurements may include a series of electromagnetic energy measurements over a predetermined time period. An interference source may be identified when each measurement in the series of electromagnetic energy measurements indicates an RF energy source at the same frequency. Each of these measurements may be stored. In addition, statistics regarding these measurements may be generated.

The present invention is also directed to a wireless communications device having a communications module, an interference detection module, and a controller. The communications module exchanges information with one or more remote devices across a short-range wireless communications network. The interference detection module generates one or more electromagnetic energy measurements. Each of these measurements corresponds to an available communications bandwidth for the wireless communications device. The controller identifies one or more interference sources based on the measurement(s).

The present invention advantageously improves the detection of interference sources because interference sources are quickly detected over an entire frequency band that is available to a communications system. By generating several measurements of electromagnetic energy, the present invention may collect interference statistics and avoid transmitting at the same frequencies and times when other, interfering systems and device are transmitting. Furthermore, the present invention advantageously provides implementations that do not significantly increase device complexity.

Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Before describing the invention in detail, it is helpful to first describe an environment in which the present invention may be employed. Accordingly, FIG. 1 is a diagram of an exemplary operational environment according to one embodiment of the present invention where short-range wireless communications devices operate in the presence of multiple interfering signals.

Figure 1:
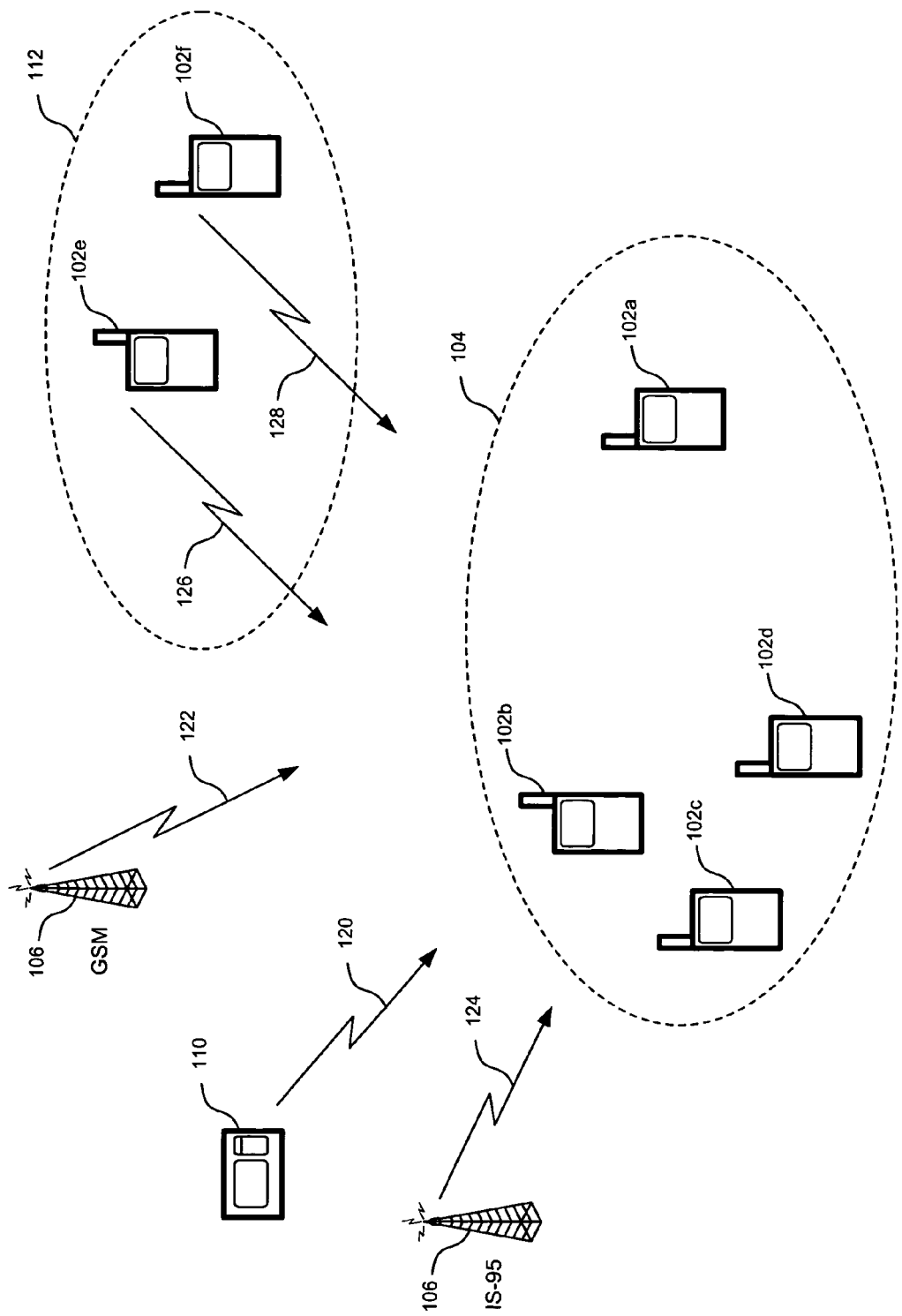
FIG. 1 is a diagram of an exemplary operational environment according to one embodiment of the present invention.

In particular, FIG. 1 shows a plurality of wireless communications devices (WCD) 102a-d participating in a short-range wireless communications network 104. Short-range network 104 may be, for example, a Bluetooth network, or an IEEE 802.11b/g network in which signals are transmitted across one or more portions of the RF spectrum (e.g., the ISM band). The portion(s) of the RF spectrum available to short-range network 104 are referred to herein as the available communications bandwidth.

In the environment of FIG. 1, devices external to network 104 may also emit signals in the available communications bandwidth of short-range network 104. These devices may be non-communications related devices. For instance, FIG. 1 shows a microwave oven 110 generating emissions 120 that are within the available communications bandwidth of short-range network 104.

In addition to non-communications related devices, devices associated with other communications systems may emit signals within the available communications bandwidth of short-range network 104. Examples of such devices include cellular base stations and phones. For instance, FIG. 1 shows a GSM cellular base station 106 emitting harmonics 122 and a IS-95 cellular base station 108 emitting harmonics 124.

Moreover transmissions from other short-range networks, such as neighboring short-range network 112, may be within the available communications bandwidth of short-range network 104. As shown in FIG. 1, neighboring short-range network 112 includes WCDs 102e and 102f, which transmit signals 126 and 128. Like network 104, neighboring short-range network 112 may be, for example, a Bluetooth or an IEEE 802.11b/g network.

These transmissions may interfere with transmissions in short-range network 104. Accordingly, devices and neighboring networks, such as the ones of FIG. 1 are referred to herein as interference sources.

Interference sources may be static or dynamic. Static interference is more regular than dynamic interference. Accordingly, static interference is easier to detect. Bluetooth interference is fairly unpredictable, because it hops randomly over the ISM band. However, interference from IEEE 802.11b/g networks is more predictable (and thus more static) because transmissions from these networks are direct-sequence spread spectrum systems that are contained within a channel that is 23 MHz wide. Interference from microwave ovens is also fairly static because of their fairly constant spectral content.

The present invention provides techniques for identifying interference sources. Once identified, one or more devices in a wireless network, such as short-range wireless network 104, may transmit signals in a manner that avoids interference from these identified sources.

II. Wireless Communications Device

Figure 2:
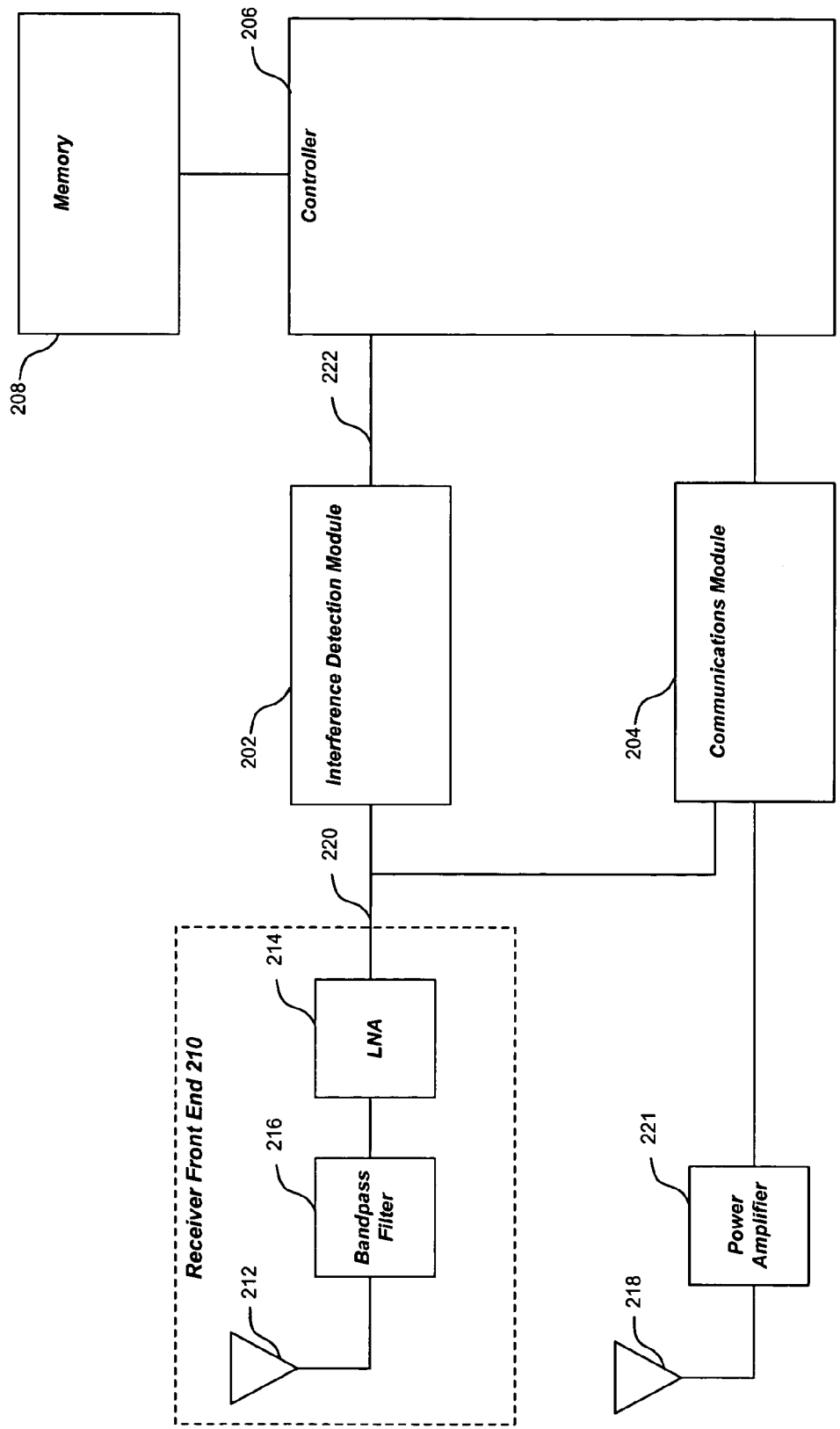
FIG. 2 is a block diagram showing an exemplary implementation of a wireless communications device according to one embodiment of the present invention.

FIG. 2 is a block diagram showing an exemplary WCD 102 implementation according to one embodiment of the present invention. As shown in FIG. 2, this implementation includes an interference detection module 202, a communications module 204, a controller 206, a memory 208, a receiver front end 210, a transmit antenna 218, and a power amplifier 221.

Receiver front end 210 includes a receive antenna 212. In addition, receiver front end 210 may include additional components, such as a low noise amplifier (LNA) 214, and a bandpass filter 216 tuned to an available communications bandwidth. Through receiver front end 210, the device receives transmissions associated with its short-range network, as well as energy (i.e., signals) from interference sources. From these transmissions and signals, receiver front end 210 generates an RF signal 220, which is sent to both interference detection module 202 and communications module 204.

Interference detection module 202 produces energy detection indicators 222 (also referred to herein as measurements), which indicate the presence of energy at certain frequencies in RF signal 220. These indicators are sent to controller 206. Interference detection module 202 is described in greater detail below, for example, with reference to FIGS. 3-6.

Communications module 204 handles the exchange of information across a wireless network, such as a Bluetooth or an IEEE 802.11b/g network. Accordingly, communications module 204 may govern processes, such as device discovery, paging, connection establishment, authentication, and encryption. For instance, in the context of Bluetooth communications, communications module 204 may include a Bluetooth module. In addition, communications module 204 may exchange information with higher level processes (e.g., applications).

As described above, communications module 204 exchanges signals with remote devices via a wireless communications network. This involves receiving signals through receiver front end 210 and transmitting signals through power amplifier 221, which is coupled to transmit antenna 218. Accordingly, communications module 204 may include components, such as modulators and demodulators to handle the reception and generation of such signals.

Controller 206 receives energy detection indicators 222 from energy detection module 202. These indicators may be stored in memory 208 as part of an operation to collect energy measurement statistics. In addition, controller 206 receives resource allocation information from communications module 204. This information identifies portions of the available communications bandwidth (e.g., channels, frequency ranges, and/or time slots) used by the wireless communications network(s) in which the device is participating.

Based on received energy detection indicators 222, controller 206 identifies interference sources, such as static interference sources. This identification may also be based on resource allocation information from communications module 204 so that any energy detection indicators 222 associated with legitimate signals are disregarded. From this identification, controller 206 directs operation of communications module 204. For example, controller 206 may indicate to communications module 204 portions of the available communications bandwidth (e.g., channels, frequency ranges, and/or time slots) that are subject to interference. Based on such indications, communications module 204 may avoid transmissions in such portions of the available communications bandwidth.

The elements of FIG. 2 may be implemented in various ways. For instance, these elements may be implemented in hardware, software, firmware, or any combination thereof. As an example, LNA 214, power amplifier 221, and bandpass filter 216 may be implemented with electronic circuitry. In alternate implementations, bandpass filter 216 may be implemented digitally, through the use of analog to digital converter(s) and one or more digital signal processors (DSPs).

Controller 206 may be implemented in various ways. For example, controller 206 may be implemented with one or more microprocessors (e.g., as a computer system) executing software instructions stored, for example, in memory 208. Alternatively, controller 206 may be implemented in firmware and/or hardware, such as application specific integrated circuits (ASICs).

Similarly, communications module 204 and interference detection module 202 may be implemented with one or more microprocessors executing software instructions stored, for example, in memory 208. However, these components may additionally be implemented with electronics and/or DSP(s).

Memory 208 may include, for example, random access memory (RAM), read only memory (ROM), and/or flash memory. Communications module 204 may be implemented through one or more devices, such as microprocessors, electronics, and digital signal processors.

Although, FIG. 2 shows a particular device implementation. Other implementations are within the scope of the present invention. For instance, a single antenna may provide the functionality of antennas 212 and 218. Further, implementations may include multiple communications modules to accommodate communications across different networks.

Figure 3:
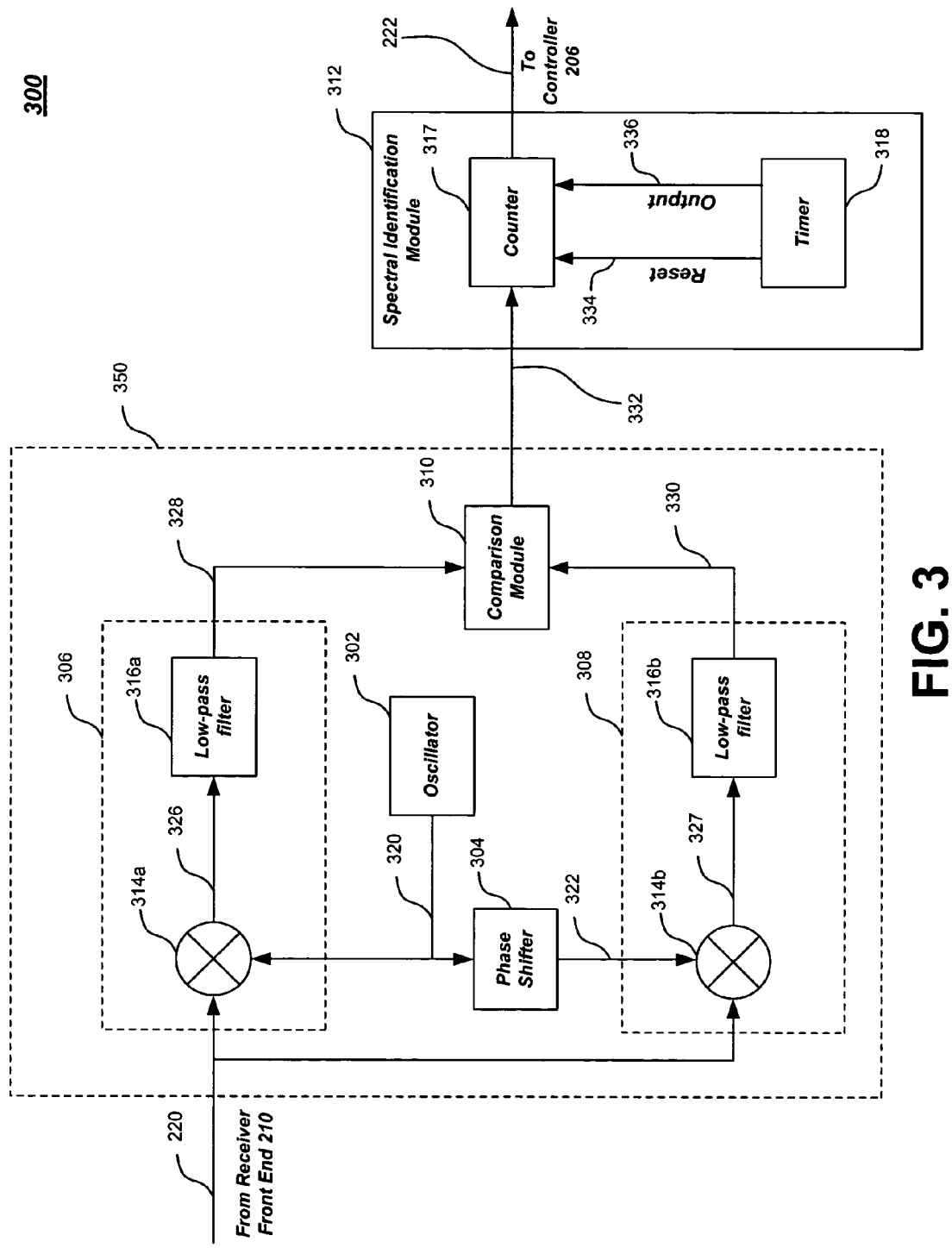
FIGS. 3-6 are block diagrams of interference detection module implementations according to embodiments of the present invention.

FIG. 3 is a diagram showing an implementation 300 of interference detection module 202 according to an embodiment of the present invention. This implementation includes an oscillator 302, a phase shifter 304, an in-phase (I) path 306, a quadrature (Q) path 308, a comparison module 310, and a spectral identification module 312. Quadrature path 308 and in-phase path 306 each includes a mixer and a low-pass filter. As shown in FIG. 3, path 306 includes a mixer 314a and a low-pass filter 316a, while path 308 includes a mixer 314b and a low-pass filter 316b. In addition, FIG. 3 shows that oscillator 302, phase shifter 304, path 306, path 308, and comparison module 310 are included in a receiver portion 350.

Oscillator 302 is tuned to a predetermined frequency, such as the center frequency in an available communications bandwidth. For instance, when the available communications bandwidth is the ISM band, oscillator 302 may be tuned to 2441.75 MHz. As shown in FIG. 3, oscillator 302 generates an oscillator signal 320, which is sent to mixer 314a of in-phase path 306.

Oscillator signal 320 is also sent to phase shifter 304, which introduces a 90 degrees phase shift. This phase shift yields a quadrature oscillator signal 322, which is sent to mixer 314b of quadrature path 308. Oscillator signals 320 and 322 may be substantially sinusoidal.

Mixers 314a and 314b are each coupled to front end 210. Accordingly, each of mixers 314a and 314b receives RF signal 220 based on emissions collected by receive antenna 212. RF signal 220 is downconverted by mixers 314a and 314b. The amount of this downconversion depends on the frequency of oscillator signals 320 and 322. Accordingly, mixer 314a generates a downconverted in-phase signal 326, while mixer 314b generates a downconverted quadrature signal 327.

Low-pass filters 316a and 316b each have bandwidths large enough to accommodate the available communications bandwidth. For instance, these filters may have a 3-dB bandwidth of 40 MHz. As shown in FIG. 3, low-pass filters 316a and 316b generate filtered signals 328 and 330. These signals are sent to comparison module 310.

Comparison module 310 may be implemented in various ways. For instance, comparison module 310 may include a differentiation node, which subtracts one of signals 328 and 330 from the other. Such operations produce a clock signal 332 having a frequency associated with the strongest energy source (e.g., the strongest interference source) in RF signal 220. Clock signal 332 is sent to spectral identification module 312.

Spectral identification module 312 determines the frequency associated with clock signal 332. This module may be implemented in various ways. As an example, FIG. 3 shows an implementation that includes a counter 317 and a timer 318. Counter 317 maintains a counter value, which is incremented based on clock signal 332. For example, the counter value may increment when clock signal 332 exceeds a certain threshold level. Alternatively, the counter value may increment for example, upon the occurrence of a rising or falling edge in clock signal 332.

As shown in FIG. 3, timer 318 generates a reset signal 334 and an output signal 336. Reset signal 334 initializes the counter value of counter 317 to zero. Output signal 336 causes counter 317 to output its counter value. This outputted counter value is sent to controller 206 as an energy detection indicator 222. Timer 318 generates signals 334 and 336 at predetermined intervals. These predetermined intervals may be set by controller 206.

Based on the length of such intervals, a frequency value may be calculated. Such a calculation may be made, for example, by dividing the counter value by the interval duration and adding an offset based on the frequency of the oscillator 302. This determined frequency value corresponds to the strongest energy source in the frequency range monitored by implementation 300. In embodiments, such calculations are performed by controller 206.

This monitored frequency range is determined by the frequency of oscillator 302 and the bandwidth of low-pass filters 316a and 316b. Thus, implementation 300 may be used to monitor an entire communications bandwidth at once. However, implementations of interference detection module 202 may be used in which a portion of an available communications bandwidth is monitored. An example of such an implementation is provided in FIG. 4.

Figure 4:
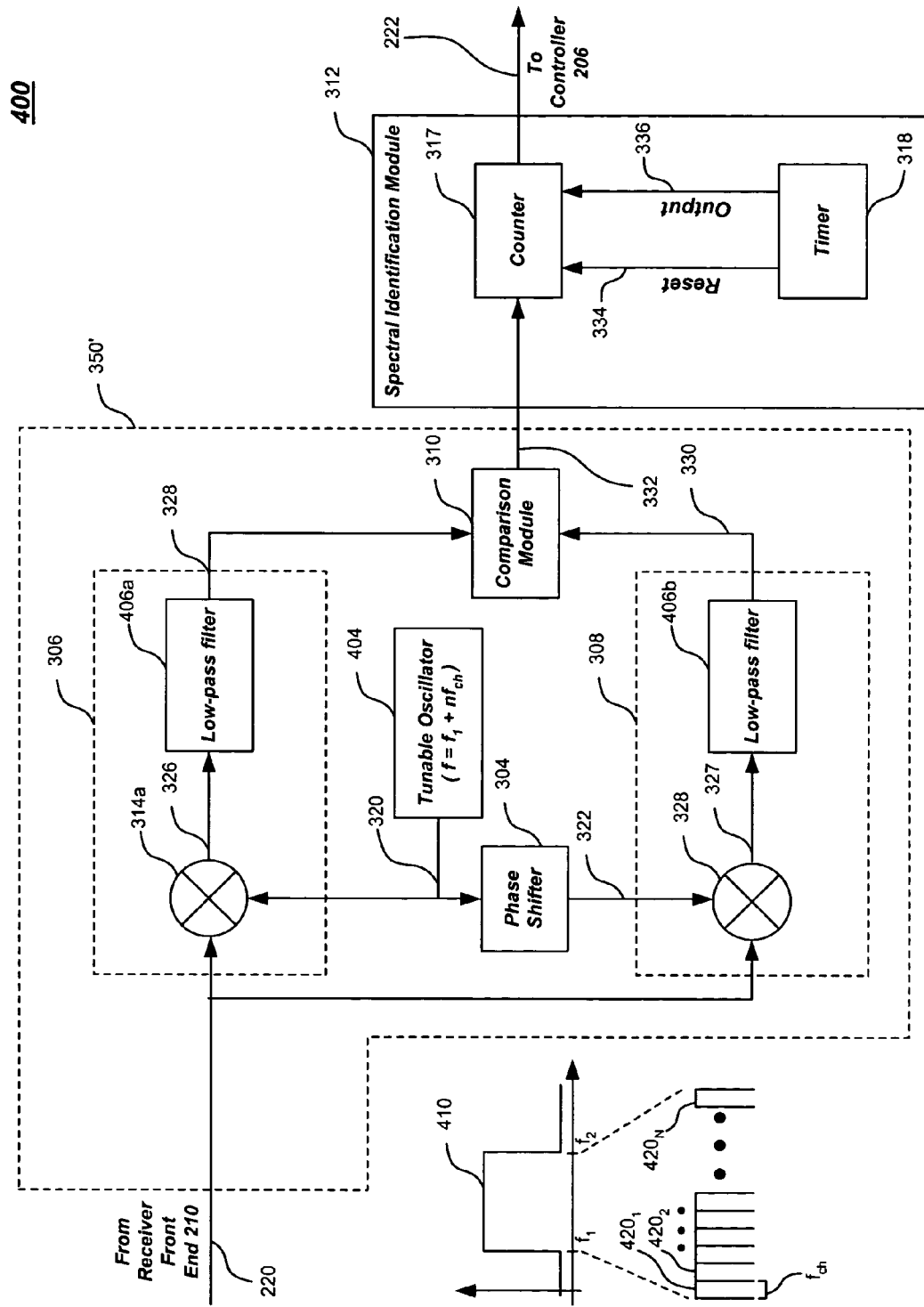

FIG. 4 is a diagram showing a further implementation 400 of interference detection module 202. In this implementation, a portion of the available communications bandwidth, referred to herein as a sub-band, is monitored. In exemplary implementations, a sub-band is 10 MHz wide. However, other sub-band sizes may be used.

The implementation of FIG. 4 is similar to the detection module implementation of FIG. 3. However, the implementation of FIG. 4 includes a tunable oscillator 404, which replaces oscillator 302. In addition, low-pass filters 406a and 406b replace low-pass filters 316a and 316b. FIG. 4 shows that oscillator 404, phase shifter 304, path 306, path 308, and comparison module 310 are included in a receiver portion 350'.

Oscillator 404 is tuned so that it corresponds to a particular sub-band (e.g., a 10 MHz wide sub-band) within the available bandwidth. For instance, oscillator 404 may be tuned to the center frequency of the particular sub-band. Low-pass filters 406a and 406b each have bandwidths large enough to accommodate a sub-band. For instance, these filters may have a 3-dB bandwidth of 5 MHz.

In FIG. 4, an example of an available communications bandwidth and its sub-bands is provided by a graph 410. As shown in FIG. 4, the available communications bandwidth is defined by a lower frequency, $f_1$, and an upper frequency, $f_2$.

A plurality of sub-bands 420, each having a bandwidth $f_{ch}$, exists within this bandwidth. Each sub-band 420 is assigned an integer index in a manner that increases with frequency. Accordingly, for a particular sub-band, oscillator 404 is tuned to a frequency, f, that is determined by the following equation:

$$f = f_{ch1} + n f_{ch}$$

In the above equation, $f_{ch1}$ is baseline frequency value beneath the lowest sub-band in the available communications bandwidth, and n is the index of the particular sub-band to which interference detection module 202 is tuned.

The implementations of FIGS. 3 and 4 may share common features with receiver(s) included in communications module 204. For instance, receiver portions 350 and 350' share similar features with frequency shift keying (FSK) based receivers, as well as with other types of receivers. Accordingly, in embodiments of the present invention interference detection module 202 may share components (such as circuitry) with receiver(s) in communications module 204. This approach advantageously provides for less complexity and a smaller silicon area if the receiver is incorporated as an integrated circuit. However, in embodiments, interference detection module 202 may be implemented separately and distinct from such receiver(s).

Figure 5:
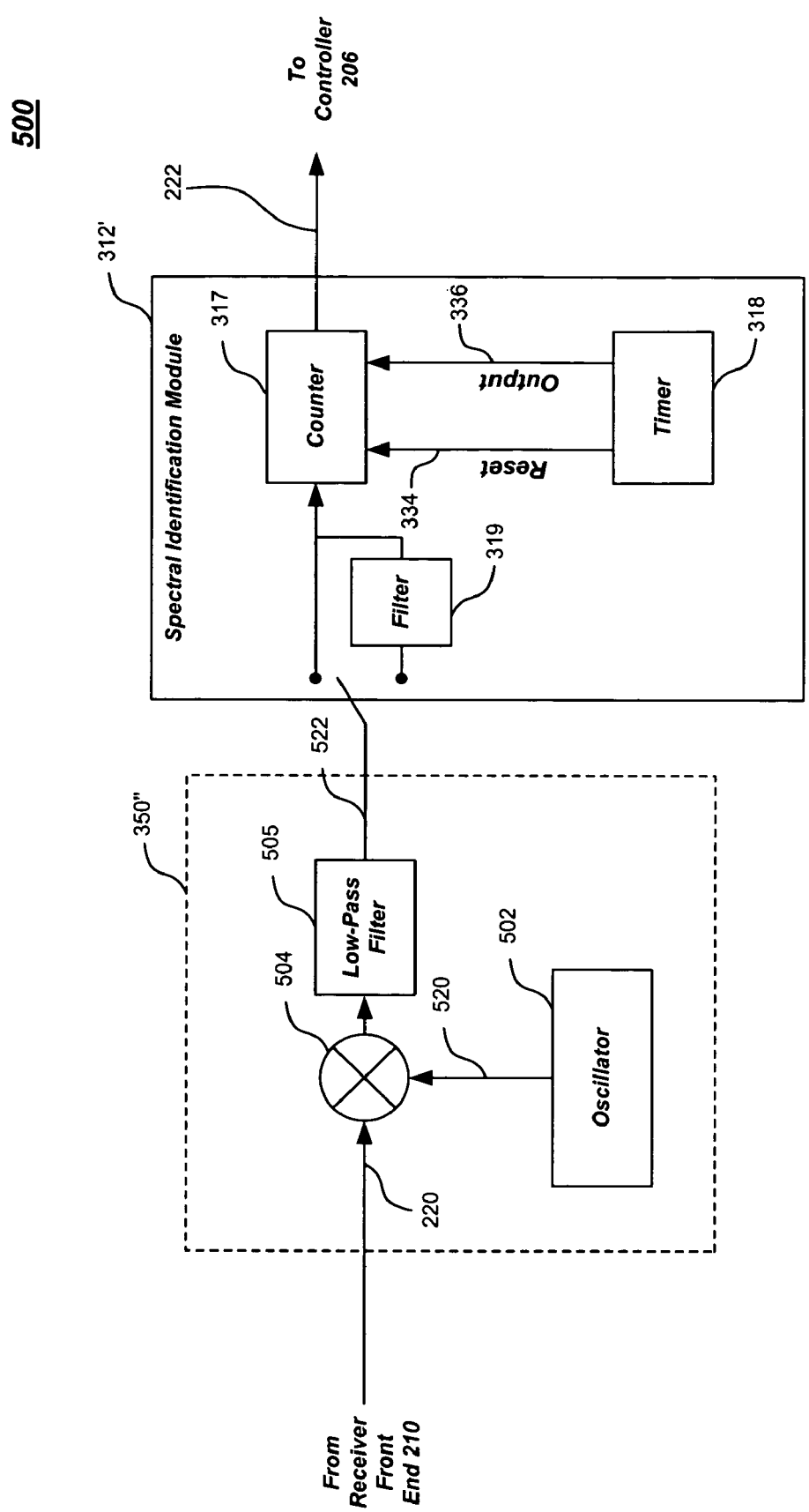
Figure 6:
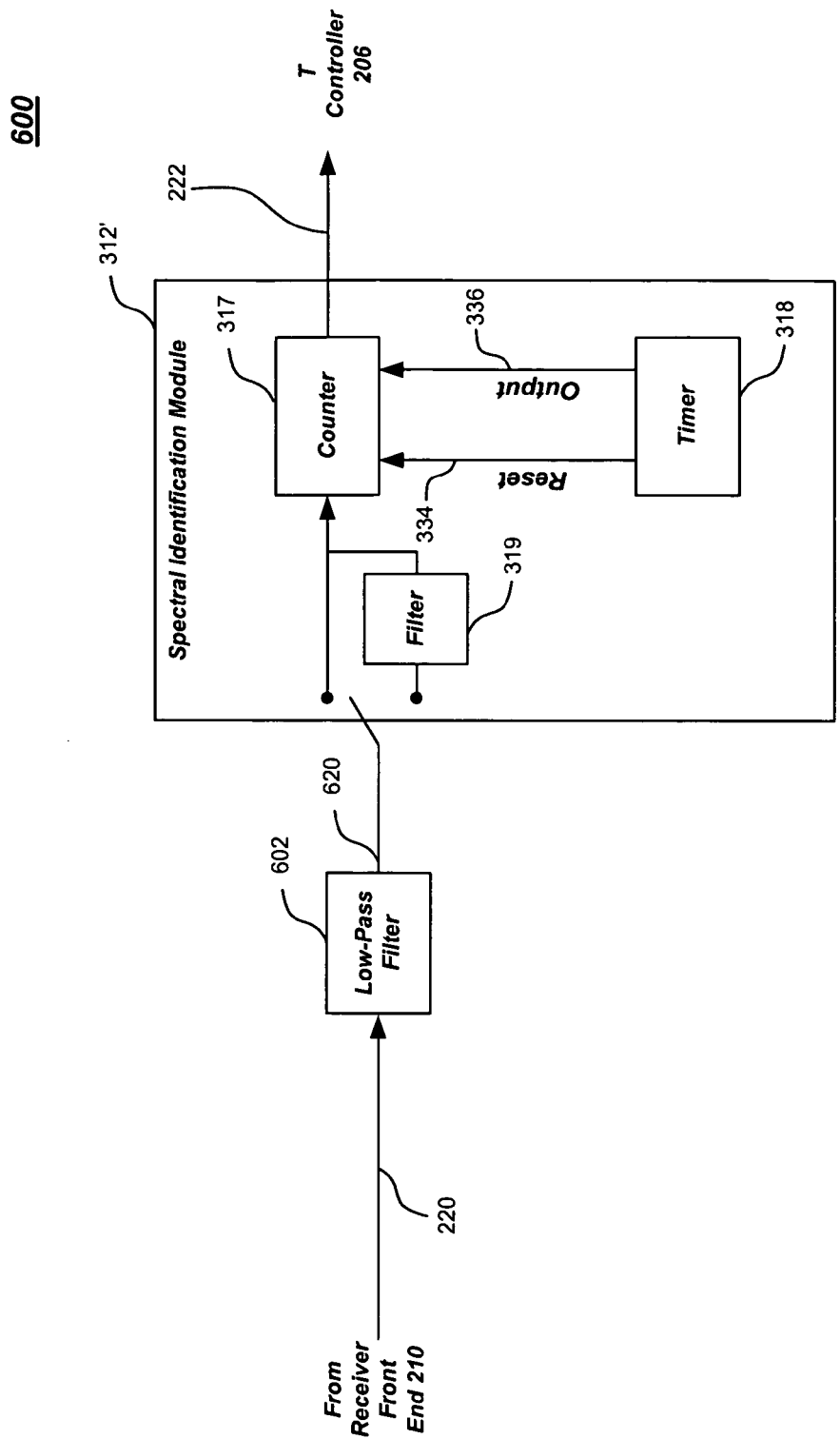

Simpler implementations of interference detection module 202 are shown in FIGS. 5 and 6. For instance, FIG. 5 is a diagram showing an implementation 500 of interference detection module 202 according to one embodiment of the present invention. As shown in FIG. 5, implementation 500 includes an oscillator 502, a mixer 504, a low-pass filter 505, and a spectral identification module 312'. In addition, FIG. 5 shows that oscillator 502 and mixer 504 are included in a receiver portion 350".

Unlike the implementations of FIGS. 3 and 4, which utilize both quadrature (Q) and in-phase (I) channels, the implementation of FIG. 5 utilizes only one of these channels. Accordingly, oscillator 502 generates an oscillator signal 520, which is tuned to the lowest end (e.g., the lowest frequency) of the available communications bandwidth. Mixer receives RF signal 220 and mixes it with oscillator signal 520. Then, the resultant signal is filtered by low-pass filter 505 to produce a downconverted signal 522.

Downconverted signal 522 is sent to spectral identification module 312'. As shown in FIG. 5, spectral identification module 312' is similar to module 312 of FIG. 3. However, module 312' includes a selectable filter 319. Filter 319 may be used to monitor only a portion of the available communications bandwidth. Accordingly, filter 319 may be implemented as either a high-pass or a low-pass filter. Filter 319 may be activated after the strongest interference source in the available communications bandwidth is identified. By using filter 319, better knowledge of band interference can be obtained. For instance, the second strongest interference source (or even less strong interference sources) may then be identified. The selective use of filter 319 is controlled by controller 206.

With implementation 500, the polarity/sideband sign of RF signal 220 is lost. However, bandpass filter 216 of receiver front end 210 may be configured to provide sufficient attenuation in order to quite reliably determine which channels are blocked by interference sources.

FIG. 6 shows an implementation 600 of interference detection module 202 according to a further embodiment of the present invention. As shown in FIG. 6, implementation 600 simply includes a low-pass filter 602 and a spectral identification module 312'. Low-pass filter 602 receives RF signal 220 and generates a filtered signal 620, which is sent to spectral identification module 312'. Within module 312', counter 317 generates energy detection indicator 222, which indicates the presence of energy at certain frequencies in signal 620. As in the implementation of FIG. 5, filter 319 may be selectively used to monitor only a portion of the available communications bandwidth and to identify second strongest (or even less strong) interference sources.

The implementations of interference detection modules 202 shown in FIGS. 3 and 4 may be modified to replace spectral identification module 312 with module 312'. Accordingly, the implementations of FIGS. 3 and 4 may also employ filter 319 to selectively monitor only a portion of the available communications bandwidth and to identify second strongest (or even less strong) interference sources.

III. Interference Detection

As described above, controller 206 may determine time intervals in which counters 317 output their values as energy detection indicators 222. In embodiments, controller 206 may establish intervals in which each counter 317 outputs a series of associated indicators 222. Such a series may occur for example, at regular intervals during a particular time period. This results in a measurement corresponding to the time period that is based on the series of indicators 222 (also referred to herein as sub-measurements). In one such example, each counter 317 outputs indicators 222 at 10 microsecond intervals during a 100 microsecond period. This results in a measurement associated with the 100 microsecond period.

Such techniques may be used to identify interference sources. For instance, the presence of an interference source is probable when, during a measurement for a particular frequency range, each sub-measurement indicates the strongest RF energy source at the same frequency. When this occurs, embodiments of the present invention may determine whether the energy from this source is strong enough to interfere with the traffic in the network(s) in which the device is participating. Such determinations may involve making an RSSI measurement of this received energy.

In contrast, the presence of noise is probable when, during a measurement for a particular frequency range, each sub-measurement indicates the strongest interference at different frequencies.

In embodiments of the present invention, such measurements may be performed at regular periods. Further, the results of each measurement (e.g., each sub-measurement) may be stored in memory 208. In one exemplary implementation, a certain number of previous measurements (e.g., the last 100 measurements) are stored in memory 208. This storage may include each individual sub-measurement. This allows controller 206 to analyze patterns and/or regularities of energy from interference sources. Such analysis may involve the generation of statistics from these measurements. From this, the possible regularity of an interference source may be identified. In devices and communications networks that are unable to change to other frequencies, this feature advantageously enables the scheduling of transmissions in the time domain to avoid interference from such sources.

Figure 7:
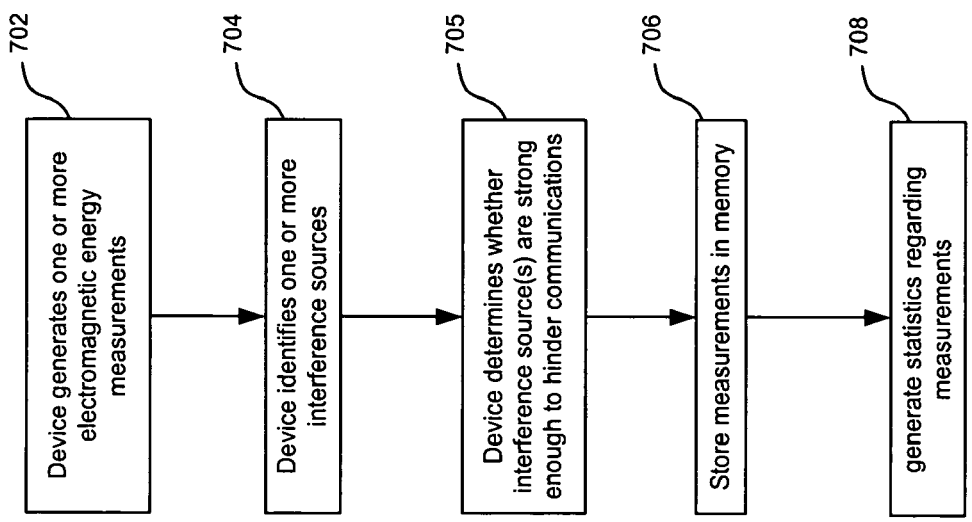
FIG. 7 is a flowchart of an operational sequence according to one embodiment of the present invention.

FIG. 7 is a flowchart illustrating an operational sequence of the present invention. This sequence may be performed by a wireless communications device, such as the device implementation described above with reference to FIG. 2. However, this sequence may also be performed in other device implementations.

This sequence begins with a step 702 in which one or more electromagnetic energy measurements are generated. Each of these measurements corresponds to an available communications bandwidth for a communications device. For instance, with reference to the environment of FIG. 1, this available communications bandwidth may be the frequency ranges at which short-range network 104 may use to transmit signals. An example of an available communications bandwidth is the ISM band.

Alternatively, the available communications bandwidth may be divided into multiple portions, such as 10 MHz sub-bands. Accordingly, in such embodiments, each of these measurements of step 702 corresponds to a particular selected portion (e.g., sub-band) of the available communications bandwidth. This division of the available bandwidth into portions and selection of portions may be performed by controller 206.

Each of the measurement(s) in step 702 indicates a frequency of a radio frequency (RF) signal source. Examples of such signal sources include the external devices described above with reference to FIG. 1. For example, each of these measurements may indicate a strongest interference source in the available communications bandwidth (or particular sub-band). In addition, each of these measurements may indicate a second strongest interference source, or any number of even less strong interference sources. This may be performed through selective filtering of the available communications bandwidth (or selected portion of the available bandwidth) through, for example, selectable filter 319.

In the device implementation of FIG. 2, step 702 may be performed by interference detection module 702. This performance may be initiated by one or more directives from controller 206 to generate measurements. For example, controller 206 may direct interference detection module 702 to generate a series of electromagnetic energy measurements (i.e., sub-measurements) over a predetermined time period. An exemplary time period is 100 microseconds and the sub-measurements may occur at 10 microsecond intervals.

In a step 704, one or more frequencies that correspond to one or more interference sources may be identified based on the measurement(s) generated in step 702. When step 702 includes generating a series of measurements (i.e., sub-measurements) over a predetermined time period, step 704 may include identifying an interference source when each sub-measurement indicates an RF energy source at the same frequency.

In a step 705, the device determines whether any of the interference source(s) are strong enough to hinder communications for any networks in which the device is participating. For example, this step may include generating one or more RSSI measurements. If the interference is sufficiently strong to hinder communications, then the device may initiate actions so that network resource allocation avoids such interference sources. For example, the device may avoid transmitting signals in certain frequency channels.

In a step 706, the communications device stores the measurement(s) from step 702. With reference to the implementation of FIG. 2, these measurements may be stored, for example, in memory 208.

In a step 708, the communications device may generate and/or compile statistics based on the measurements stored in step 706. Such statistics may be used to identify transmission patterns (likely times of interference) at various frequencies of the available communications bandwidth.

The steps of FIG. 7 may be performed repeatedly. For instance, when the available communications bandwidth is divided into portions, such as sub-bands, the steps of FIG. 7 may be performed for each of the portions.

The techniques of the present invention advantageously provide for the measurement of an entire communications bandwidth in a short amount of time. For example, a whole communications bandwidth can be measured once in about 1 millisecond. As described above, this measurement may includes a plurality (e.g., 10) sub-measurements. Accordingly, the present invention provides a significant reduction in time, power, and bandwidth consumption.

Furthermore, the present invention allows for a more effective collection of interference statistics pertaining to the whole communications bandwidth. This is because, with conventional techniques, interfering systems (such as static interferers) may have stopped transmitting signals before the possible regularity of their transmissions have been detected.

IV. Conclusion

While various embodiments of the present invention have been described above, it should be understood that they have been presented by way of example only, and not in limitation. For instance, although examples have been described involving Bluetooth and IEEE 802.11 technologies, other short-range and longer range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   (a) receiving electromagnetic energy including network transmissions in a plurality of channels in an available communications bandwidth of a single wireless communications system type and interference signals from interference sources;
   (b) converting the received electromagnetic energy to RF signals including at least a first sub-band and a non-overlapped second sub-band of said available communications bandwidth of the network transmissions, each sub-band containing a sub-plurality of said plurality of channel frequencies;
   (c) generating a first clock signal from said RF signals in said first sub-band;
   (d) generating a second clock signal from RF signals in said second sub-band, wherein said first and second clock signals have respective first and second frequencies associated with said interference signals;
   (e) identifying said one or more interference sources based on said first and second frequencies; and
   (f) avoiding use of channels in either said first sub-band or said second sub-band based on said identified one or more interference sources.

2. The method of claim 1, wherein said identifying one or more interferences sources comprises identifying an interference source in response to an identification that said first and second frequencies correspond to an RF energy source at the same frequency.

3. The method of claim 1, further comprising storing the one or more electromagnetic energy measurements.

4. The method of claim 1, wherein the available communications bandwidth is within the Industrial, Scientific, and Medical (ISM) band.

5. A wireless communications device, comprising:
   a communications module configured to exchange information with one or more remote devices across a short-range wireless communications network;
   an interference detection module configured to generate one or more electromagnetic energy measurements in a corresponding one or more of a plurality of sub-band portions of an available communications bandwidth of a single wireless communications system type for the wireless communications device, by scanning said available bandwidth on a sub-band by sub-band basis and performing the measurements in each of the one or more sub-bands, each of the plurality of sub-bands being a substantially equal fraction of said available bandwidth, said available communications bandwidth including a plurality of channels, each channel having a channel bandwidth, and each of said sub-band portions having a bandwidth larger than said channel bandwidth and including two or more channels, wherein generating said one or more electromagnetic energy measurements further comprises:
      converting received electromagnetic energy to RF signals including at least a first sub-band and a non-overlapped second sub-band of said available communications bandwidth, wherein said received electromagnetic energy includes network transmissions in said plurality of channels in said available communications bandwidth of said single wireless communications system type and interference signals from one or more interferences sources;
      generating a first clock signal from said RF signals in said first sub-band; and
      generating a second clock signal from RF signals in said second sub-band,
   wherein said first and second clock signals have respective first and second frequencies associated with said interference signals;
   a controller configured to identify said first and second frequencies;
   said controller identifying said one or more interference sources based on said first and second frequencies; and
   said controller directing the communications module to avoid use of channels in either said first sub-band or said second sub-band based on said identified one or more interference sources.

6. The wireless communications device of claim 5, further comprising a memory configured to store the plurality of electromagnetic energy measurements.

7. The wireless communications device of claim 5, wherein the controller directs the interference detection module to generate a series of electromagnetic energy measurements over a predetermined time period.

8. The wireless communications device of claim 7, wherein the controller identifies an interference source in response to an identification that said first and second frequencies correspond to an RF energy source at the same frequency.

9. The wireless communications device of claim 5, wherein the short-range wireless communications network is a Bluetooth network.

10. The wireless communications device of claim 5, wherein the short-range wireless communications network is an IEEE 802.11 network.

11. The wireless communications device of claim 5, wherein the available communications bandwidth is within the Industrial, Scientific, and Medical (ISM) band.

12. A system, comprising:
   means for receiving electromagnetic energy including network transmissions in a plurality of channels in an available communications bandwidth of a single wireless communications system type and interference signals from interference sources;
   means for converting the received electromagnetic energy to RF signals including at least a first sub-band and a non-overlapped second sub-band of said available communications bandwidth of the network transmissions, each sub-band containing a sub-plurality of said plurality of channel frequencies;

means for generating a first clock signal from said RF signals in said first sub-band;

means for generating a second clock signal from RF signals in said second sub-band, wherein said first and second clock signals have respective first and second frequencies associated with said interference signals;

means for identifying said one or more interference sources based on said first and second frequencies; and means for avoiding use of channels in either said first sub-band or said second sub-band based on said identified one or more interference sources.

13. A computer program product, comprising:

a non-transitory computer useable medium having computer program logic recorded thereon; and program code in said computer useable medium for enabling a processor to:

receive electromagnetic energy including network transmissions in a plurality of channels in an available communications bandwidth of a single wireless communications system type and interference signals from interference sources;

convert the received electromagnetic energy to RF signals including at least a first sub-band and a non-overlapped second sub-band of said communications bandwidth of the network transmissions, each sub-band containing a sub-plurality of channel frequencies;

generate a first clock signal from RF signals in said first sub-band and to generate a second clock signal from RF signals in said second sub-band, said first and second clock signals having respective first and second frequencies associated with said interference signals;

communicate in said network using selected channel frequencies of said plurality of channels in said communications bandwidth; and identify said interference sources based on said first and second frequencies and avoid using channels in either said first sub-band or said second sub-band based on said identifying said interference sources.

14. An apparatus, comprising:

a receiver configured to receive electromagnetic energy including network transmissions in a plurality of channels in an available communications bandwidth of a single wireless communications system type and interference signals from interference sources;

an interference detection module coupled to the receiver, configured to convert the received electromagnetic energy to RF signals including at least a first sub-band and a non-overlapped second sub-band of said communications bandwidth of the network transmissions, each sub-band containing a sub-plurality of said plurality of channel frequencies;

said interference detection module further configured to generate a first clock signal from RF signals in said first sub-band and to generate a second clock signal from RF signals in said second sub-band, said first and second clock signals having respective first and second frequencies associated with said interference signals;

a communications module coupled to the receiver, configured to communicate in said network using selected channel frequencies of said plurality of channels in said communications bandwidth; and a controller coupled to said interference detection module and to said communications module, configured to identify said interference sources based on said first and second frequencies and configured to direct said communications module to avoid using channels in either said first sub-band or said second sub-band based on said identifying said interference sources.

15. An apparatus, comprising:

a receiver configured to receive electromagnetic energy including network transmissions in a plurality of channels in an available communications bandwidth of a single wireless communications system type and interference signals from interference sources;

an interference detection module coupled to the receiver, configured to separate from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;

a comparator in said interference detection module, configured to compare said in-phase and quadrature phase RF signals for said first sub-band and output a first clock signal and to compare said in-phase and quadrature phase RF signals for said second sub-band and output a second clock signal, said first and second clock signals having respective first and second frequencies associated with said interference signals;

a communications module coupled to the receiver, configured to communicate using selected channel frequencies of said plurality of channels in said communications bandwidth;

a controller coupled to said interference detection module and to said communications module, configured to identify said interference sources based on said first and second frequencies and configured to direct said communications module to avoid using channels in either said first sub-band or said second sub-band based on said identifying said interference sources.

16. A method, comprising:

(a) receiving electromagnetic energy including network transmissions in a plurality of channels in an available communications bandwidth of a single wireless communications system type and interference signals from interference sources;

(b) converting the received electromagnetic energy to RF signals including at least a first sub-band and a non-overlapped second sub-band of said available communications bandwidth of the network transmissions, each sub-band containing a sub-plurality of said plurality of channel frequencies;

(c) generating a first clock signal from said RF signals in said first sub-band;

(d) generating a second clock signal from RF signals in said second sub-band, wherein said first and second clock signals have respective first and second frequencies associated with said interference signals;

(e) identifying said one or more interference sources based on said first and second frequencies; and (f) identifying one or more channels for a subsequent transmission based on the identified one or more interference sources.

17. The method of claim 16, wherein said identifying one or more interferences sources comprises identifying an interference source in response to an identification that said first and second frequencies correspond to an RF energy source at the same frequency.

18. The method of claim 16, further comprising storing the one or more electromagnetic energy measurements.

19. The method of claim 16, wherein the available communications bandwidth is within the Industrial, Scientific, and Medical (ISM) band.

20. A system, comprising:
means for receiving electromagnetic energy including network transmissions in a plurality of channels in an available communications bandwidth of a single wireless communications system type and interference signals from interference sources;
means for converting the received electromagnetic energy to RF signals including at least a first sub-band and a non-overlapped second sub-band of said available communications bandwidth of the network transmissions, each sub-band containing a sub-plurality of said plurality of channel frequencies;
means for generating a first clock signal from said RF signals in said first sub-band;
means for generating a second clock signal from RF signals in said second sub-band, wherein said first and second clock signals have respective first and second frequencies associated with said interference signals;
means for identifying said one or more interference sources based on said first and second frequencies; and
means for identifying one or more channels for a subsequent transmission based on the identified one or more interference sources.

21. A computer program product, comprising;
a non-transitory computer useable medium having computer program logic recorded thereon; and
program code in said computer useable medium for enabling a processor to:
receive electromagnetic energy including network transmissions in a plurality of channels in an available communications bandwidth of a single wireless communications system type and interference signals from interference sources;
convert the received electromagnetic energy to RF signals including at least a first sub-band and a non-overlapped second sub-band of said communications bandwidth of the network transmissions, each sub-band containing a sub-plurality of said plurality of channel frequencies;
generate a first clock signal from RF signals in said first sub-band and to generate a second clock signal from RF signals in said second sub-band, said first and second clock signals having respective first and second frequencies associated with said interference signals;
communicate in said network using selected channel frequencies of said plurality of channels in said communications bandwidth;
identify said interference sources based on said first and second frequencies; and
identify one or more channels for a subsequent transmission based on the identified one or more interference sources.

22. An apparatus, comprising:
a receiver configured to receive electromagnetic energy including network transmissions in a plurality of channels in an available communications bandwidth of a single wireless communications system type and interference signals from interference sources;
an interference detection module coupled to the receiver, configured to convert the received electromagnetic energy to RF signals including at least a first sub-band and a non-overlapped second sub-band of said communications bandwidth of the network transmissions, each sub-band containing a sub-plurality of said plurality of channel frequencies;
said interference detection module further configured to generate a first clock signal from RF signals in said first sub-band and to generate a second clock signal from RF signals in said second sub-band, said first and second clock signals having respective first and second frequencies associated with said interference signals;
a communications module coupled to the receiver, configured to communicate in said network using selected channel frequencies of said plurality of channels in said communications bandwidth; and
a controller coupled to said interference detection module and to said communications module, configured to identify said interference sources based on said first and second frequencies and configured to identify one or more channels for a subsequent transmission based on the identified one or more interference sources.

23. A method, comprising:
(a) receiving electromagnetic energy including network transmissions in a plurality of channels in an available communications bandwidth of a single wireless communications system type and interference signals from interference sources;
(b) separating from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
(c) comparing said in-phase and quadrature phase RF signals for said first sub-band and outputting a first clock signal and comparing said in-phase and quadrature phase RF signals for said second sub-band and outputting a second clock signal, said first and second clock signals having respective first and second frequencies associated with said interference signals;
(d) identifying said interference sources based on said first and second frequencies; and
(e) avoiding use of channels in either said first sub-band or said second sub-band based on said identifying said interference sources.

24. A system, comprising:
means for receiving electromagnetic energy including network transmissions in a plurality of channels in an available communications bandwidth of a single wireless communications system type and interference signals from interference sources;
means for separating from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
means for comparing said in-phase and quadrature phase RF signals for said first sub-band and outputting a first clock signal and comparing said in-phase and quadrature phase RF signals for said second sub-band and outputting a second clock signal, said first and second clock signals having respective first and second frequencies associated with said interference signals;
means for identifying said interference sources based on said first and second frequencies; and means for avoiding use of channels in either said first sub-band or said second sub-band based on said identifying said interference sources.

25. A computer program product, comprising:
a non-transitory computer useable medium having computer program logic recorded thereon; and
program code in said computer useable medium for enabling a processor to:
  receive electromagnetic energy including network transmissions in a plurality of channels in an available communications bandwidth of a single wireless communications system type and interference signals from interference sources;
  separate from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
  compare said in-phase and quadrature phase RF signals for said first sub-band and output a first clock signal and compare said in-phase and quadrature phase RF signals for said second sub-band and output a second clock signal, said first and second clock signals having respective first and second frequencies associated with said interference signals;
  identify said interference sources based on said first and second frequencies; and
  avoid use of channels in either said first sub-band or said second sub-band based on said identifying said interference sources.

26. A method, comprising:
(a) receiving electromagnetic energy including network transmissions in a plurality of channels in an available communications bandwidth of a single wireless communications system type and interference signals from interference sources;
(b) separating from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
(c) comparing said in-phase and quadrature phase RF signals for said first sub-band and outputting a first clock signal and comparing said in-phase and quadrature phase RF signals for said second sub-band and outputting a second clock signal, said first and second clock signals having respective first and second frequencies associated with said interference signals;
(d) identifying said interference sources based on said first and second frequencies; and
(e) identifying one or more channels for a subsequent transmission based on the identified one or more interference sources.

27. A system, comprising:
means for receiving electromagnetic energy including network transmissions in a plurality of channels in an available communications bandwidth of a single wireless communications system type and interference signals from interference sources;
means for separating from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
means for comparing said in-phase and quadrature phase RF signals for said first sub-band and outputting a first clock signal and comparing said in-phase and quadrature phase RF signals for said second sub-band and outputting a second clock signal, said first and second clock signals having respective first and second frequencies associated with said interference signals;
means for identifying said interference sources based on said first and second frequencies; and
means for identifying one or more channels for a subsequent transmission based on the identified one or more interference sources.

28. A computer program product, comprising:
a non-transitory computer useable medium having computer program logic recorded thereon; and
program code in said computer useable medium for enabling a processor to:
  receive electromagnetic energy including network transmissions in a plurality of channels in an available communications bandwidth of a single wireless communications system type and interference signals from interference sources;
  separate from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
  compare said in-phase and quadrature phase RF signals for said first sub-band and output a first clock signal and compare said in-phase and quadrature phase RF signals for said second sub-band and output a second clock signal, said first and second clock signals having respective first and second frequencies associated with said interference signals;
  identify said interference sources based on said first and second frequencies; and
  identify one or more channels for a subsequent transmission based on the identified one or more interference sources.

29. An apparatus, comprising:
a receiver configured to receive electromagnetic energy including network transmissions in a plurality of channels in an available communications bandwidth of a single wireless communications system type and interference signals from interference sources;
an interference detection module coupled to the receiver, configured to separate from the received electromagnetic energy in-phase and quadrature phase RF signals including at least a first sub-band and a non-overlapped second sub-band of said communications bandwidth of the network transmissions, each sub-band containing a sub-plurality of said plurality of channel frequencies;
a comparator in said interference detection module, configured to compare said in-phase and quadrature phase RF signals for said first sub-band and output a first clock signal and to compare said in-phase and quadrature phase RF signals for said second sub-band and output a second clock signal, said first and second clock signals having respective first and second frequencies associated with said interference signals;
a communications module coupled to the receiver, configured to communicate in using selected channel frequencies of said plurality of channels in said communications bandwidth;

a controller coupled to said interference detection module and to said communications module, configured to identify said interference sources based on said first and second frequencies and configured to identify one or more channels for a subsequent transmission based on the identified one or more interference sources.

* * * * *

UNITED STATES PATENT AND TRADEMARK OFFICE
CERTIFICATE OF CORRECTION

| | | |
|---|---|---|
| PATENT NO. | : 7,848,741 B2 | |
| APPLICATION NO. | : 10/747220 | |
| DATED | : December 7, 2010 | |
| INVENTOR(S) | : Kivekäs et al. | |

It is certified that error appears in the above-identified patent and that said Letters Patent is hereby corrected as shown below:

On the Title page, item (76), under "Inventors", Line 2, delete "02176" and insert -- 02170 --.

Sheet 4 of 7, Figure 4, Line 2 (in Box 404), delete "$f=f_1+nf_{ch}$" and insert -- $f=f_{ch1}+nf_{ch}$ --.

Sheet 6 of 7, Figure 6, Lines 1-2 (above reference numeral 206), delete "T Controller" and insert -- To Controller --.

Column 3, line 67, delete "invention;" and insert -- invention. --.

Column 5, line 41, delete "energy detection module" and insert -- interference detection module --.

Column 10, line 27, delete "interference detection module 702." and insert -- interference detection module 202. --.

Column 10, line 30, delete "interference detection module 702" and insert -- interference detection module 202 --.

Column 11, line 53, in Claim 2, delete "interferences" and insert -- interference --.

Column 12, line 24, in Claim 5, delete "interferences" and insert -- interference --.

Column 13, line 6, in Claim 12, delete "sub- band;" and insert -- sub-band; --.

Column 13, line 8, in Claim 12, delete "sub- band," and insert -- sub-band, --.

Column 13, line 16, in Claim 13, delete "comprising;" and insert -- comprising: --.

Column 13, line 30, in Claim 13, delete "of channel" and insert -- of said plurality of channel --.

Signed and Sealed this
Thirty-first Day of May, 2011

David J. Kappos
*Director of the United States Patent and Trademark Office*

Column 14, line 64, in Claim 17, delete "interferences" and insert -- interference --.

Column 18, line 13, in Claim 28, delete "comprising;" and insert -- comprising: --.